（12）United States Patent
Lee et al.

(10) Patent No.: US 11,623,420 B2
(45) Date of Patent: Apr. 11, 2023

(54) METHOD FOR MANUFACTURING POLARIZING PLATE USING MASK FILM AND POLARIZING PLATE MANUFACTURED BY SAME

(71) Applicant: LG CHEM, LTD., Seoul (KR)

(72) Inventors: Byung Sun Lee, Daejeon (KR); Kyun Il Rah, Daejeon (KR)

(73) Assignee: LG Chem, Ltd., Seoul (KR)

( * ) Notice: Subject to any disclaimer, the term of this patent is extended or adjusted under 35 U.S.C. 154(b) by 11 days.

(21) Appl. No.: 17/260,454

(22) PCT Filed: Aug. 22, 2019

(86) PCT No.: PCT/KR2019/010696
§ 371 (c)(1),
(2) Date: Jan. 14, 2021

(87) PCT Pub. No.: WO2020/040569
PCT Pub. Date: Feb. 27, 2020

(65) Prior Publication Data
US 2021/0268754 A1 Sep. 2, 2021

(30) Foreign Application Priority Data
Aug. 22, 2018 (KR) .......................... 10-2018-0097780

(51) Int. Cl.
B29D 11/00 (2006.01)
B32B 3/10 (2006.01)
(Continued)

(52) U.S. Cl.
CPC ............ B29D 11/0073 (2013.01); B32B 3/10 (2013.01); B32B 7/023 (2019.01); B32B 7/12 (2013.01); B32B 27/20 (2013.01); B32B 27/306 (2013.01); B32B 27/308 (2013.01); B32B 37/12 (2013.01); B32B 37/26 (2013.01); B32B 38/04 (2013.01);
(Continued)

(58) Field of Classification Search
CPC .......... B29D 11/0073; B29D 11/00644; B29D 11/00317; B32B 3/10; B32B 7/023; B32B 7/12; B32B 27/20; B32B 27/306; B32B 27/308; B32B 37/12; B32B 37/26; B32B 38/04; B32B 38/10; B32B 2037/268; B32B 2038/047; B32B 2255/10; B32B 2255/20; B32B 2255/24; B32B 2270/00; B32B 2309/105; B32B 2551/00; G02B 5/3025; G02B 5/3033; G02F 1/133528
See application file for complete search history.

(56) References Cited

U.S. PATENT DOCUMENTS 5,868,947 A 2/1999 Sakaguchi et al.
2006/0227263 A1 10/2006 Kunai
(Continued)

FOREIGN PATENT DOCUMENTS

CN 101946305 A 1/2011
CN 106662695 A 5/2017
(Continued)

Primary Examiner — Cynthia L Schaller
(74) Attorney, Agent, or Firm — Dentons US LLP

(57) ABSTRACT

The present specification relates to a method for manufacturing a polarizing plate using a mask film used for manufacturing a polarizing plate having a locally bleached area, and a polarizing plate manufactured using the same.

5 Claims, 6 Drawing Sheets

(51) Int. Cl.
  *B32B 37/12* (2006.01)
  *B32B 37/26* (2006.01)
  *B32B 38/10* (2006.01)
  *B32B 7/023* (2019.01)
  *B32B 7/12* (2006.01)
  *B32B 27/20* (2006.01)
  *B32B 27/30* (2006.01)
  *B32B 38/04* (2006.01)
  *G02B 5/30* (2006.01)

(52) U.S. Cl.
  CPC ............ B32B 38/10 (2013.01); G02B 5/3025 (2013.01); *B32B 2037/268* (2013.01); *B32B 2038/047* (2013.01); *B32B 2255/10* (2013.01); *B32B 2255/20* (2013.01); *B32B 2255/24* (2013.01); *B32B 2270/00* (2013.01); *B32B 2309/105* (2013.01); *B32B 2551/00* (2013.01)

(56) References Cited

U.S. PATENT DOCUMENTS

| | | |
|---|---|---|
| 2008/0233329 A1 | 9/2008 | Mori |
| 2010/0284072 A1 | 11/2010 | Saitou |
| 2010/0294954 A1 | 11/2010 | Gates et al. |
| 2016/0299272 A1 | 10/2016 | Lee et al. |
| 2016/0313480 A1 | 10/2016 | Lee et al. |
| 2017/0129197 A1 | 5/2017 | Yaegashi et al. |
| 2017/0131451 A1 | 5/2017 | Yaegashi et al. |
| 2017/0137671 A1* | 5/2017 | Ogomi ................ G02B 5/3033 |
| 2017/0254939 A1 | 9/2017 | Lee et al. |
| 2018/0120489 A1 | 5/2018 | Yaegashi et al. |
| 2018/0188430 A1 | 7/2018 | Nagano et al. |
| 2021/0292604 A1 | 9/2021 | Lee et al. |

FOREIGN PATENT DOCUMENTS

| | | |
|---|---|---|
| CN | 107533182 A | 1/2018 |
| JP | 62-41386 A | 2/1987 |
| JP | 2006-267555 A | 10/2006 |
| JP | 2009-205135 A | 9/2009 |
| JP | 2012173487 A | 9/2012 |
| JP | 2014-81482 A | 5/2014 |
| JP | 2016027135 A | 2/2016 |
| JP | 2017-009907 A | 1/2017 |
| JP | 2017-194568 A | 10/2017 |
| JP | 2021-530001 A | 11/2021 |
| KR | 10-2016-0006795 A | 1/2016 |
| KR | 10-2016-0016904 A | 2/2016 |
| KR | 10-2016-0129819 A | 11/2016 |
| KR | 10-2017-0083995 A | 7/2017 |
| WO | 2016182017 A1 | 11/2016 |

* cited by examiner

[FIG. 1]
[FIG. 2]
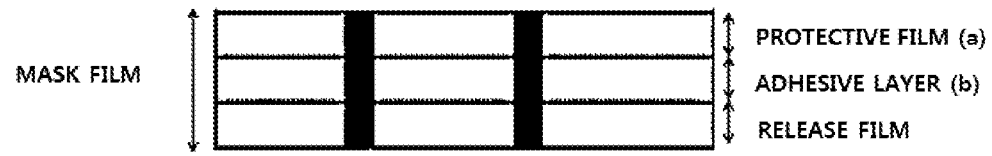

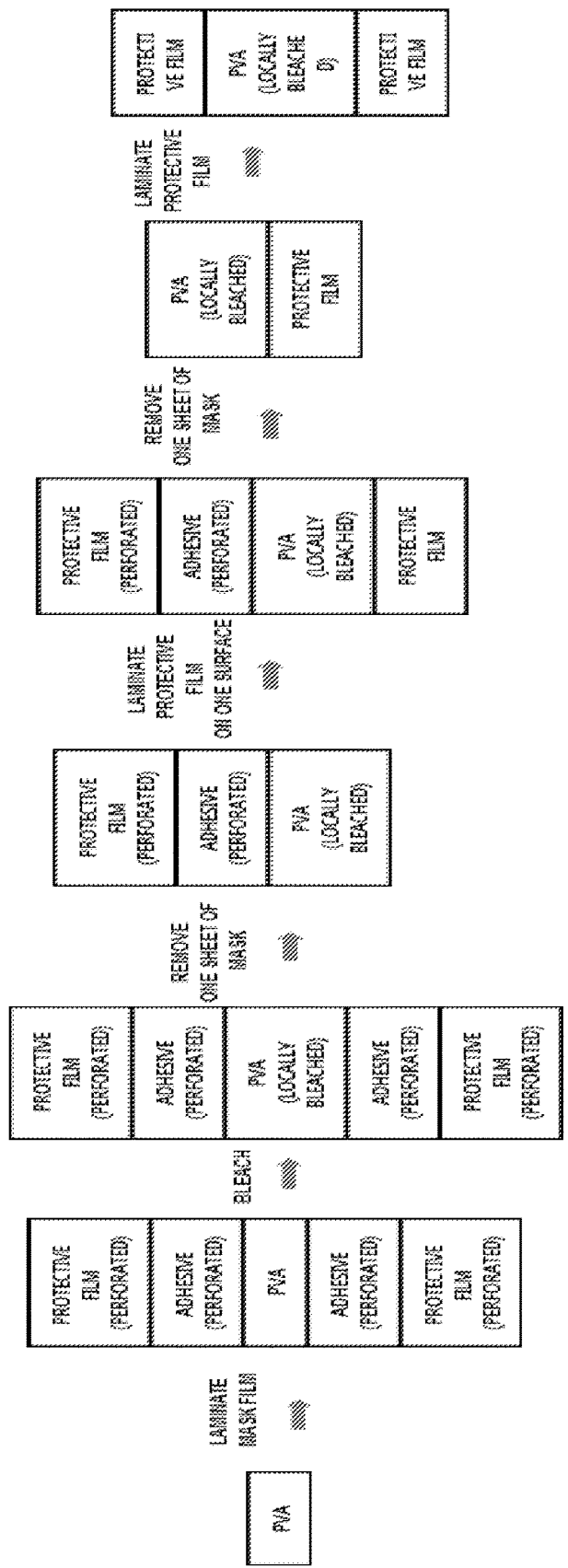

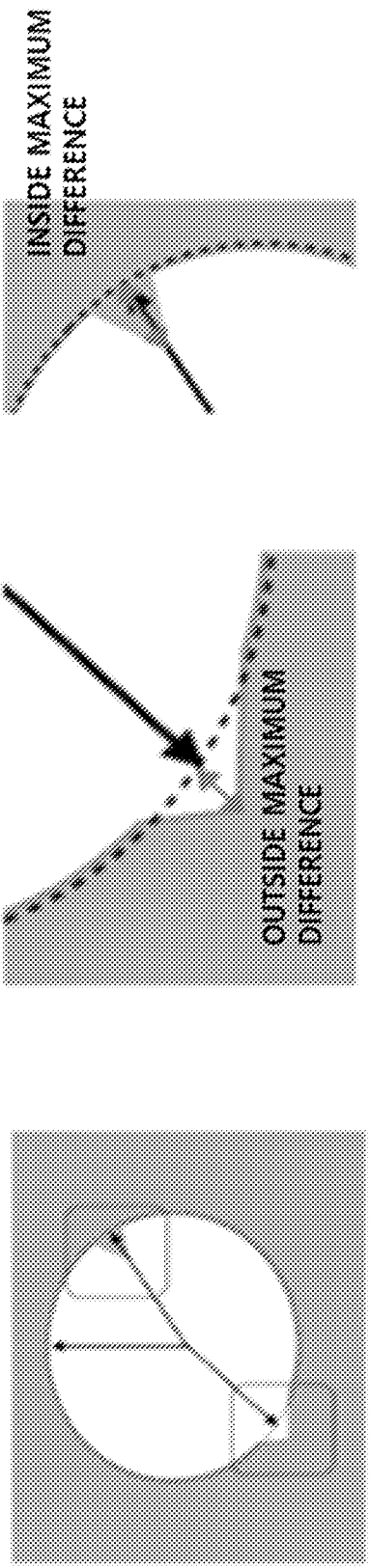
[FIG. 4]

[FIG. 5]
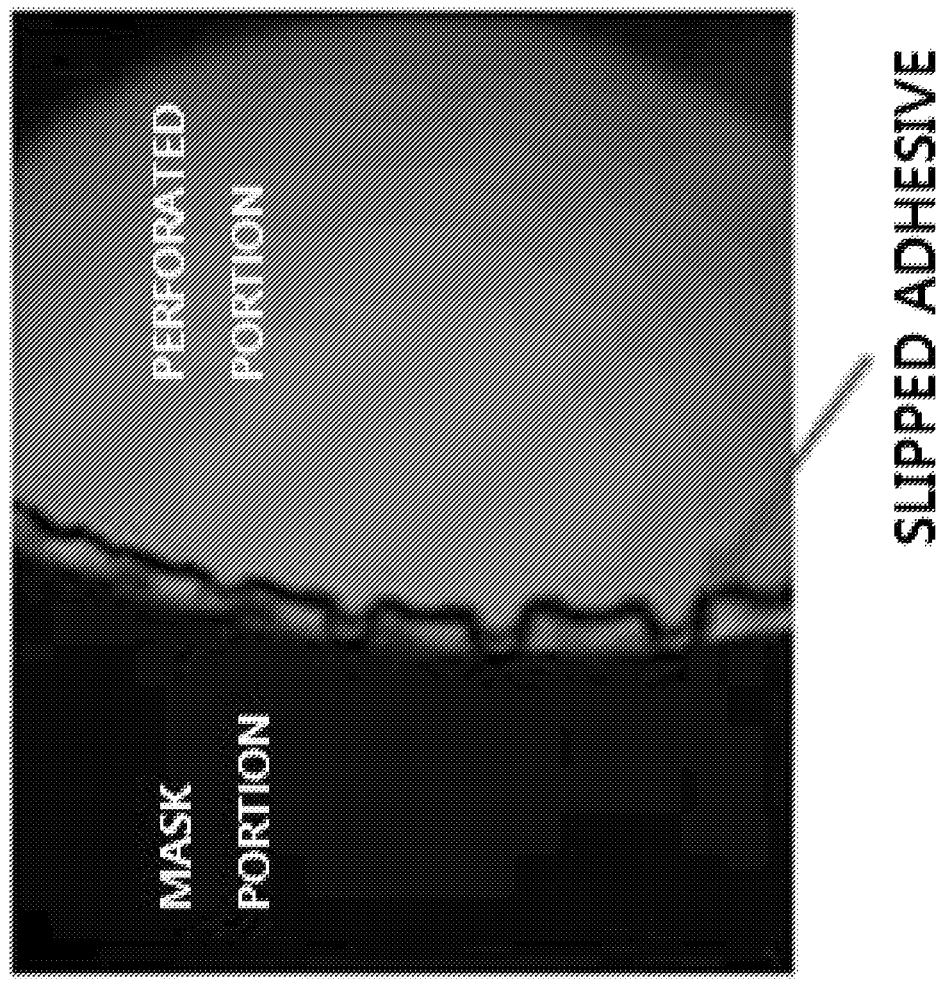

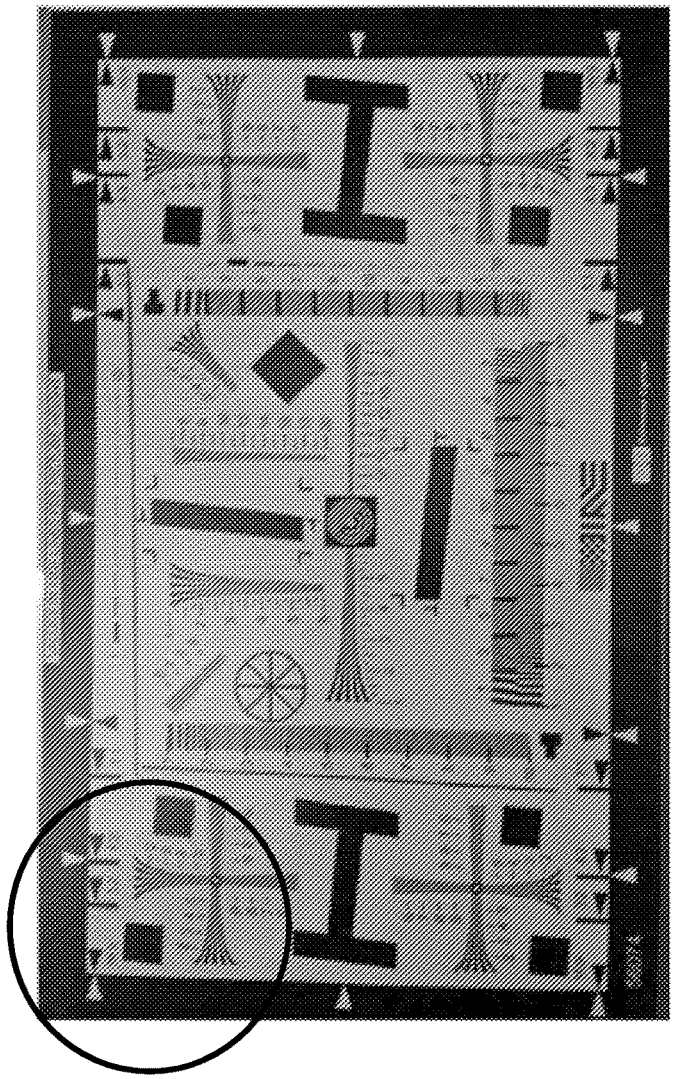
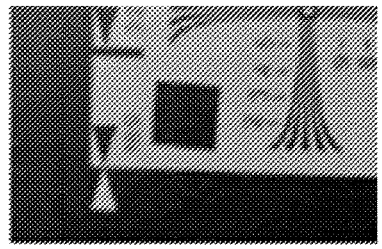
[FIG. 6]

[FIG. 7]
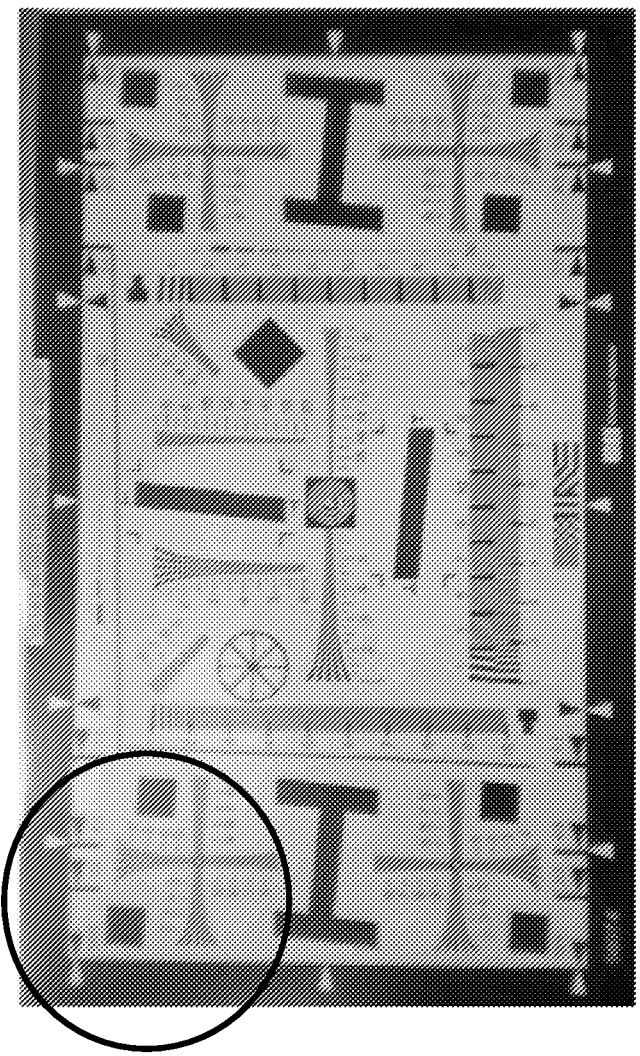
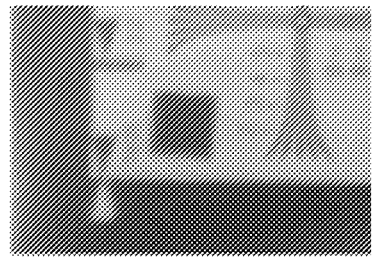

METHOD FOR MANUFACTURING POLARIZING PLATE USING MASK FILM AND POLARIZING PLATE MANUFACTURED BY SAME

This application is a National Phase entry pursuant to 35 U.S.C. § 371 of International Application No. PCT/KR2019/0010696 filed on Aug. 22, 2019, and claims priority to and the benefits of Korean Patent Application No. 10-2018-0097780, filed with the Korean Intellectual Property Office on Aug. 22, 2018, the entire contents of which are incorporated herein by reference.

TECHNICAL FIELD

The present disclosure relates to a mask film used for manufacturing a polarizing plate having a locally bleached area through chemical treatment, and a method for manufacturing a polarizing plate using the same.

BACKGROUND ART

Polarizing plates have been used in various display devices such as liquid crystal display devices and organic light emitting diodes. Polarizing plates currently used mostly are used in a form of dyeing a polyvinyl alcohol (hereinafter, PVA)-based film with iodine and/or a dichroic dye, crosslinking the iodine and/or the dichroic dye using boric acid and the like, and orienting the result using a method of elongation to prepare a PVA polarizer, and laminating a protective film on one surface or both surfaces of the prepared PVA polarizer.

Meanwhile, recent display devices tend to be slimmer, and a thickness of a bezel unit in which a screen is not displayed and an edge thickness tend to be minimized in order to obtain a large screen. In addition, components such as a camera tend to be installed in a display device in order to exhibit various functions, and attempts to provide various colors or bleach in a product logo or an edge area have been tried considering design factors.

However, in an existing polarizing plate, the whole area of the polarizing plate is dyed with iodine and/or a dichroic dye, and therefore, the polarizing plate shows a dark black color, and as a result, it is difficult to provide various colors to a display device, and particularly, when a polarizing plate is placed on a component such as a camera, the polarizing plate absorbs 50% or greater of the quantity of light causing a problem such as visibility decline in a camera lens.

In order to resolve such a problem, a method of physically removing a polarizing plate at a part covering a camera lens by punching a hole (perforating) on a part of the polarizing plate using a method of punching, cutting and the like has been commercialized.

However, such a physical method degrades an appearance of an image display device, and may damage a polarizing plate due to the nature of the proliferating process. Meanwhile, in order to prevent damages such as polarizing plate tearing, the perforated portion of the polarizing plate needs to be formed in an area sufficiently far from an edge, and when using such a polarizing plate as a result, a bezel unit of an image display device becomes relatively wide, which is out of a recent trend of a narrow bezel design in an image display device. In addition, when installing a camera module on a perforated portion of a polarizing plate as above, a camera lens is exposed to the outside also causing a problem that contamination and damages readily occur in the camera lens when used for a long period of time.

DISCLOSURE

Technical Problem

The present disclosure has been made in view of the above, and is directed to providing a mask film used for manufacturing a polarizing plate having a locally bleached area through chemical treatment, a polarizing plate having excellent surface roughness and haze by minimizing wrinkles in a polarization-removed area while removing polarization without physically punching a hole as in the art.

The present disclosure is directed to providing a method for manufacturing a polarizing plate using a mask film used for manufacturing a polarizing plate having a locally bleached area through chemical treatment with excellent process efficiency, and a polarizing plate manufactured using the same.

Technical Solution

One embodiment of the present disclosure provides a method for manufacturing a polarizing plate having a non-polarized portion, the method including providing a mask film having a protective film, an adhesive layer disposed on one surface of the protective film, and a perforated portion integrally passing through the protective film and the adhesive layer, wherein the adhesive layer has a thickness of 6 μm to 80 μm; laminating the mask film on both surfaces of a polarizer; bleaching a part corresponding to the perforated portion of the mask film; and removing the mask film from the polarizer.

Another embodiment of the present disclosure provides a laminate including a polarizer; and a mask film disposed on both surfaces of the polarizer, wherein the mask film has a protective film; an adhesive layer disposed on one surface of the protective film, and a perforated portion integrally passing through the protective film and the adhesive layer.

Another embodiment of the present disclosure provides a polarizing plate having a non-polarized portion manufactured according to the method for manufacturing a polarizing plate of the present disclosure.

Another embodiment of the present disclosure provides an image display device including the polarizing plate described above.

Advantageous Effects

A mask film according to an embodiment of the present disclosure is, by adjusting a thickness of an adhesive within a specific range, capable of enhancing accuracy of perforation when forming a perforated portion in the mask film, and preventing an adhesive from flowing out during a roll to roll process, and, by laminating the mask film on both surfaces of a polarizer having iodine or a dichroic dye and conducting bleaching, the bleaching rate is high, and only a target part can be bleached providing an advantage of excellent process efficiency.

DESCRIPTION OF DRAWINGS

FIG. 1 illustrates a mask film formed with a protective film and an adhesive layer according to an embodiment of the present disclosure.

FIG. 2 illustrates a mask film formed with a protective film, an adhesive layer and a release film according to an embodiment of the present disclosure.

FIG. 3 illustrates a method for manufacturing a polarizing plate according to an embodiment of the present disclosure.

FIG. 4 schematically shows a method of measuring edge roughness according to an embodiment of the present disclosure.

FIG. 5 shows a phenomenon of adhesive slip.

FIG. 6 is a picture photographed using a polarizer having a bleached portion satisfying edge roughness of 30 μm or less in a lens.

FIG. 7 is a picture photographed using a polarizer having a bleached portion with edge roughness of greater than 30 μm in a lens.

MODE FOR DISCLOSURE

Hereinafter, preferred embodiments of the present disclosure will be described. However, embodiments of the present disclosure may be modified to various other forms, and the scope of the present disclosure is not limited to the embodiments described below. In addition, embodiments of the present disclosure are provided in order to more fully describe the present disclosure to those having average knowledge in the art.

In the present specification, a "perforated portion" means a part having a hole.

In the present specification, (meth)acrylic acid means acrylic acid or methacrylic acid.

In the present specification, (meth)acrylate means acrylate or methacrylate.

An embodiment of the present disclosure provides a method for manufacturing a polarizing plate having a non-polarized portion, the method including providing a mask film having a protective film, an adhesive layer disposed on one surface of the protective film, and a perforated portion integrally passing through the protective film and the adhesive layer, wherein the adhesive layer has a thickness of 6 μm to 80 μm; laminating the mask film on both surfaces of a polarizer; bleaching a part corresponding to the perforated portion of the mask film; and removing the mask film from the polarizer. By laminating the mask film on both surfaces, local bleaching of the polarizer may be quickly conducted.

The adhesive may have a thickness of 6 μm to 80 μm, and preferably 6 μm to 30 μm. The adhesive thickness being less than 6 μm has a problem of reducing coating uniformity, and when removing the mask film after the bleaching reaction, a phenomenon of the adhesive being transferred to the polarizer surface occurs. The adhesive having a thickness of greater than 80 μm has problems in that perforation is not accurate due to adhesive slip occurring when perforating the mask film, or the adhesive flows out due to adhesive pressing, and the adhesive also flows out when laminating the perforated mask film on the polarizer.

In one embodiment of the present disclosure, the mask film may further have a release film attached to the adhesive layer, and the release film is detachable from the adhesive layer.

In another embodiment of the present disclosure, the mask film may have a perforated portion integrally passing through the protective film, the adhesive layer and the release film.

In one embodiment of the present disclosure, there are two or more of the perforated portions, and they are disposed in a length direction of the mask film at a predetermined interval.

In one embodiment of the present disclosure, there are two or more of the perforated portions, and they are disposed equally spaced in at least a length direction of the mask film.

In one embodiment of the present disclosure, there are two or more of the perforated portions, and they are disposed equally spaced in a length direction of the mask film and a width direction of the mask film.

FIG. 1 illustrates a mask film formed with a protective film and an adhesive layer according to an embodiment of the present disclosure.

FIG. 2 illustrates a mask film formed with a protective film, an adhesive layer and a release film according to an embodiment of the present disclosure.

A relatively dark part in each of FIG. 1 and FIG. 2 means a perforated portion passing through the mask film.

The forming of a perforated portion in the mask film is not particularly limited, and may be conducted through film perforating methods well known in the art such as mold machining, knife machining or laser machining.

According to one embodiment of the present disclosure, the forming of a perforated portion may be conducted through laser machining. The laser machining may be conducted using laser machining devices generally known in the art, and is not particularly limited. The condition of the laser machining such as a laser device type, output and a laser pulse repetition rate may be different depending on the material and the thickness of the film, the shape of the perforated portion and the like, and those skilled in the art may properly select a laser machining condition considering factors such as above. For example, when using a polyolefin film having a thickness of 30 μm to 100 μm as a protective film of a mask film, a perforated portion may be formed using a carbon dioxide ($CO_2$) laser device having a peak wavelength of approximately 9 μm to 11 μm or an ultraviolet (UV) device having a peak wavelength of approximately 300 nm to 400 nm, and herein, the maximum average output of the laser device may be approximately from 0.1 W to 30 W, and the pulse repetition rate may be from approximately 0 kHz to 50 kHz, however, the condition is not limited thereto.

As the protective film of the mask film of the present disclosure, olefin-based films such as polyethylene (PE), polypropylene (PP) or polyethylene terephthalate (PET); or vinyl acetate-based films such as ethylene vinyl acetate (EVA) or polyvinyl acetate may be used, however, the protective film of the mask film is not limited thereto. In addition, although not limited thereto, the thickness of the mask film may be approximately from 10 μm to 100 μm, and preferably approximately from 10 μm to 70 μm.

One embodiment of the present disclosure provides a laminate including a polarizer; and the mask film described above provided on each of both surfaces of the polarizer.

The locally bleached area of the present disclosure may be a depolarized area.

The laminating of the mask film on both surfaces of a polarizer may be conducted using film lamination methods well known in the art such as a method of attaching a mask film and a polarizing element through an adhesive layer, and herein, adhesives such as acryl-based adhesives, silicone-based adhesives, epoxy-based adhesives or rubber-based adhesives may be used as the adhesive layer, however, the adhesive layer is not limited thereto.

According to one embodiment of the present disclosure, the adhesive layer includes two different types of acryl-based copolymer resins. In addition, the adhesive layer may further include a crosslinking agent. Modulus and adhesive strength of the adhesive may be controlled depending on the content of the crosslinking agent.

In the present specification, the two types of acryl-based copolymer resins may each be expressed as a first acryl-based copolymer resin and a second acryl-based copolymer resin. In addition, the first acryl-based copolymer resin may be expressed as copolymer resin A, and the second acryl-based copolymer resin may be expressed as copolymer resin B.

As one embodiment, the adhesive layer may use an adhesive obtained by mixing two different types of acryl-based copolymer resins in a certain ratio, and adding and mixing a crosslinking agent thereto. Modulus and adhesive strength of the adhesive may be controlled depending on the content of the crosslinking agent.

According to one embodiment of the present disclosure, the adhesive layer may include a first acryl-based copolymer resin; a second acryl-based copolymer resin; and a crosslinking agent.

More specifically, the adhesive layer may be obtained by mixing a first acryl-based copolymer resin and a second acryl-based copolymer resin, and adding and mixing a crosslinking agent thereto. The first acryl-based copolymer resin may be mixed in a ratio of 6 parts by weight to 12 parts by weight, and preferably 8 parts by weight to 10 parts by weight based on 1 parts by weight of the second acryl-based copolymer resin.

According to one embodiment, the first acryl-based copolymer resin includes alkyl (meth)acrylate; hydroxyalkyl (meth)acrylate; and (meth)acrylic acid.

More specifically, the first acryl-based copolymer resin may include alkyl (meth)acrylate in 90 parts by weight to 98 parts by weight; hydroxyalkyl (meth)acrylate in 0.5 parts by weight to 2 parts by weight; and (meth)acrylic acid in 1 parts by weight to 8 parts by weight based on 100 parts by weight of total monomers of the first acryl-based copolymer resin, and preferably alkyl (meth)acrylate in 92 parts by weight to 96 parts by weight; hydroxyalkyl (meth)acrylate in 0.5 parts by weight to 1.5 parts by weight; and (meth)acrylic acid in 3 parts by weight to 7 parts by weight based on 100 parts by weight of total monomers of the first acryl-based copolymer resin.

According to one embodiment, the second acryl-based copolymer resin includes alkyl (meth)acrylate; hydroxyalkyl (meth)acrylate; (meth)acrylic acid; and polyalkyl (meth)acrylate.

More specifically, the first acryl-based copolymer resin may include alkyl (meth)acrylate in 89 parts by weight to 96 parts by weight; hydroxyalkyl (meth)acrylate in 0.5 parts by weight to 2 parts by weight; (meth)acrylic acid in 1 parts by weight to 8 parts by weight; and polyalkyl (meth)acrylate in 1 parts by weight to 8 parts by weight based on 100 parts by weight of total monomers of the first acryl-based copolymer resin, and preferably alkyl (meth)acrylate in 90 parts by weight to 95 parts by weight; hydroxyalkyl (meth)acrylate in 0.5 parts by weight to 1.5 parts by weight; (meth)acrylic acid in 2 parts by weight to 6 parts by weight; and polyalkyl (meth)acrylate in 2 parts by weight to 6 parts by weight based on 100 parts by weight of total monomers of the first acryl-based copolymer resin.

In the present specification, the alkyl group included in the alkyl (meth)acrylate may be linear or branched, and the number of carbon atoms of the alkyl group may be from 1 to 20. The alkyl (meth)acrylate may include one, two or more types selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylbutyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate and stearyl (meth)acrylate, but is not limited thereto.

The polyalkyl (meth)acrylate means a plurality of the alkyl groups bonding in a repeated form in the alkyl (meth)acrylate.

In the present specification, the hydroxyalkyl (meth)acrylate may include one, two or more types selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate and 2-hydroxyethylene glycol (meth)acrylate, but is not limited thereto.

According to one embodiment, the first acryl-based copolymer resin includes butyl acrylate; 2-hydroxyethyl (meth)acrylate; and acrylic acid.

According to one embodiment, the second acryl-based copolymer resin includes butyl acrylate; 2-hydroxyethyl (meth)acrylate; acrylic acid; and methacryloyl polymethyl methacrylate.

In the present disclosure, when immersing a polarizer having the mask film including a perforated portion laminated thereon into a bleaching solution, the bleaching solution is in contact with the polyvinyl alcohol-based polarizer through the perforated portion, and as a result, bleaching partially occurs only in a part corresponding to the perforated portion area.

Meanwhile, the perforated portion may be formed so as to correspond to the form of an area to bleach, and the shape or forming location is not particularly limited. For example, the perforated portion may be formed on a location at which a component such as a camera is installed to correspond to the shape of the component, may be formed to have a product logo shape in an area in which the product logo is printed, or may be formed in a frame form on the edge part of the polarizer when attempting to provide a color on the edge part of the polarizer.

According to one embodiment of the present disclosure, a step of providing a release film on a surface opposite to the surface facing the polarizer of the protective film of the mask film may be further included before the forming of a bleached area.

Conducting a bleaching process after further providing a release film has an advantage of minimizing sagging caused by MD contraction occurring due to polarizer swelling.

In the present disclosure, the protective film of the mask film is removed after local bleaching, and is different from the protective film of the polarizing plate for protecting the polarizing plate. The removing of the mask film may be conducted using a method of peeling the mask film from the polarizer. More specifically, the removing of the mask film may be conducted using a method of peeling the mask film from the polarizer using a peeling roll or the like.

In the present disclosure, a bleaching solution may be used when treating a part corresponding to the perforated portion. Herein, the bleaching solution is preferably a strong basic solution having a pH of 11 to 14, and more specifically, may include one or more types of bleaching agents selected from the group consisting of sodium hydroxide (NaOH), sodium hydrosulfide (NaSH), sodium azide (NaN$_3$), potassium hydroxide (KOH), potassium hydrosulfide (KSH) and potassium thiosulfate (KS$_2$O$_3$). Meanwhile, the bleaching agent in the bleaching solution preferably has a concentration of approximately 1% by weight to 30% by weight, and the bleaching solution may have viscosity of approximately 1 cps to 2000 cps, and preferably approximately 5 cps to 2000 cps. When the viscosity of the bleaching solution satisfies the above-mentioned numerical range, a printing process may be smoothly conducted, and diffusing or flowing down to the printed bleaching solution by the movement of the polarizing element in a continuous process line may be prevented, and accordingly, the bleached area may be formed in a target area in a target shape. Meanwhile, the viscosity of the bleaching solution may properly vary depending on a printing device used, surface properties of the polarizer, and the like. For example, when using a gravure printing method, the bleaching solution may have viscosity of approximately 1 cps to 2000 cps and preferably approximately 5 cps to 200 cps, and when using an inkjet printing method, the bleaching solution may have viscosity of approximately 1 cps to 55 cps and preferably approximately 5 cps to 20 cps.

According to one embodiment of the present disclosure, the bleaching solution may further include a viscosity agent. A method of further adding a viscosity agent is preferred in order to have the viscosity of the bleaching solution satisfying the above-mentioned range. Accordingly, the viscosity agent suppresses diffusion of the solution by enhancing viscosity of the bleaching solution, and helps with forming a bleached area in target size and location. Coating a solution having high viscosity on a fast-moving polarizer prevents the solution from diffusing to unwanted parts by reducing a difference in the relative velocity between the liquid produced during the coating and the polarizer, and reduces the flow of the coated solution during the time of bleaching after coating and before washing, and as a result, a bleached area having target location or size may be formed.

The viscosity agent is not particularly limited as long as it has low reactivity and is capable of increasing solution viscosity. According to one embodiment of the present disclosure, the viscosity agent includes one or more types selected from the group consisting of polyvinyl alcohol-based resins, polyvinylacetoacetate-based resins, acetoacetyl group-modified polyvinyl alcohol-based resins, butenediol vinyl alcohol-based resins, polyethylene glycol-based resins and polyacrylamide-based resins.

According to another embodiment, the viscosity agent may be included in 0.5% by weight to 30% by weight with respect to the total weight of the bleaching solution. Specifically, according to one embodiment of the present disclosure, the viscosity agent may be included in 2.5% by weight to 15% by weight with respect to the total weight of the bleaching solution. When the viscosity agent content is greater than the above-mentioned range, viscosity becomes too high and washing is not effective, and when the viscosity agent content is too low, viscosity is low making it difficult to obtain a bleached area having target shape and size due to diffusion and flow of the liquid.

According to one embodiment of the present disclosure, the bleaching solution may include the bleaching agent in 1% by weight to 30% by weight; the viscosity agent in 0.5% by weight to 30% by weight; and water in 40% by weight to 70% by weight with respect to the total weight.

Meanwhile, a mechanism of depolarization through the bleaching of the present disclosure may be specifically described as follows.

An iodine and/or dichroic dye-dyed polyvinyl alcohol complex is known to absorb light in a visible range having a wavelength range of 400 nm to 800 nm. Herein, when bringing the bleaching solution into contact with the polarizer, the iodine and/or dichroic dye absorbing light in a visible wavelength range present in the polarizer is decomposed bleaching the polarizer, and transmittance increases and a degree of polarization decreases.

For example, when bringing an aqueous solution including potassium hydroxide (KOH), the bleaching agent, into contact with some areas of the iodine-dyed polyvinyl alcohol-based polarizer, the iodine is decomposed in a series of processes such as the following Chemical Equation 1 and Chemical Equation 2. Meanwhile, when going through a boric acid crosslinking process when preparing the iodine-dyed polyvinyl alcohol-based polarizer, potassium hydroxide directly decomposes boric acid as described in the following Chemical Equation 3 removing a crosslinking effect through hydrogen bonding of the polyvinyl alcohol and the boric acid.

$$12KOH + 6I_2 \rightarrow 2KIO_3 + 10KI + 6H_2O \quad \text{[Chemical Equation 1]}$$

$$I_5^- + IO_3^- + 6H^+ \rightarrow 3I_2 + 3H_2O$$

$$I_3^- \rightarrow I^- + I_2 \quad \text{[Chemical Equation 2]}$$

$$B(OH)_3 + 3KOH \rightarrow K_3BO_3 + 3H_2O \quad \text{[Chemical Equation 3]}$$

In other words, iodine and/or iodine ion complex such as $I_5^-$ (620 nm), $I_3^-$ (340 nm) or $I_2^-$ (460 nm) is decomposed by absorbing light in a visible region to produce $I^-$ (300 nm or less) or a salt, and most of the light in a visible region transmits. As a result, polarization function is removed in a region of approximately 400 nm to 800 nm, a visible region, in the polarizer increasing overall transmittance and making the polarizer transparent. In other words, polarization function may be removed by decomposing the arranged iodine complex absorbing visible light into a monomolecular form that does not absorb visible light in order to make polarized light in the polarizer.

According to one embodiment of the present disclosure, a step of washing using an alcohol or acid solution may be further included after the forming of a bleached area. When the bleaching solution remaining in the forming of a bleached area is not properly washed, the solution diffuses or remains on the polarizer, and the bleached area may be formed in unwanted size and shape, and a bleached area having a fine size is difficult to form.

Particularly, the alcohol may be suitably used since it is readily dried and is thereby readily removed, and does not affect transmittance or a degree of polarization of the polarizer other than the bleached area. For example, the alcohol is preferably, although not limited thereto, ethanol, methanol, propanol, butanol, isopropyl alcohol or a mixture thereof. In addition, as for the acid solution, the remaining bleaching agent that is mostly basic is removed while going through a neutralization reaction with the acid solution, and examples of the acid solution may include an aqueous acetic acid solution, an aqueous adipic acid solution, an aqueous boric acid solution, an aqueous phosphoric acid solution, an aqueous lactic acid solution, an aqueous sulfuric acid solution, an aqueous nitric acid solution or a mixed solution thereof, but are not limited thereto.

The washing may be conducted by immersing the polarizer into the alcohol for 1 second to 180 seconds, and more preferably for 3 seconds to 30 seconds, or coating the alcohol or the acid solution on the local area bleached by being in contact with the bleaching solution using a dispenser, inkjet or the like.

The method for manufacturing a polarizing plate including a bleached area according to one embodiment of the present disclosure includes washing with the alcohol or the acid solution after using the bleaching agent, and as discussed above, the iodine compound, salt and the like formed by the bleaching agent are washed away, and the content of the iodine and the iodine ion complex in the bleached area is minimized. Accordingly, the remaining iodine and iodine ion complex in the bleached area absorb less light, and an effect of more transparency is obtained.

In the present disclosure, edge roughness of the bleached portion is 30 μm or less, preferably 20 μm or less, and favorably 0 μm or closer to 0 μm.

In the present disclosure, the edge roughness means a sum of an outside maximum difference and an inside maximum difference in a circle at a line drawn for every 2 degrees at any point of the bleached portion. FIG. 4 schematically shows a method of measuring the edge roughness. When the edge roughness is 30 μm or less, the bleached portion shape becomes clearer. This value is favorably 0 μm or closer to 0 μm. This means that the function of the device does not decline when placing the bleached portion on a lens part of a device such as a camera module.

FIG. 6 and FIG. 7 respectively shows a case photographed using a polarizer having the bleached portion satisfying edge roughness of 30 μm or less in a lens, and a case photographed using a polarizer having the bleached portion with edge roughness of greater than 30 μm in a lens. When comparing FIG. 6 and FIG. 7, it may be identified that the image corresponding to a side (part expressed as circle in FIG. 6 and FIG. 7) is blurred in the image photographed using a polarizer having the bleached portion satisfying edge roughness of greater than 30 μm in a lens.

In the present disclosure, edge roughness of the perforated portion of the mask film is 30 μm or less, preferably 20 μm or less, and favorably 0 μm or closer to 0 μm. Edge roughness of the perforated portion of the mask film means a sum of an outside maximum difference and an inside maximum difference in a circle at a line drawn for every 2 degrees at any point of the perforated portion. In other words, as the edge roughness of the perforated portion of the mask film is 0 μm or closer to 0 μm, edge roughness of the bleached portion of the polarizer more readily becomes 30 μm or less when progressing a bleaching process of the polarizer using the mask film. Using such a polarizer in a lens part of a device such as a camera module does not decline function of the device.

According to one embodiment of the present disclosure, a step of forming an optical layer on at least one surface of the polarizer may be further included after the forming of a bleached area. Herein, the optical layer may be a polymer film layer such as a protective film or a retardation film, may be a functional film layer such as a brightness enhancement film, may be a functional layer such as a hard coating layer, an anti-reflection layer or an adhering layer.

More specifically, according to one embodiment of the present disclosure, the optical layer is formed on the other surface of the polarizer. In other words, the optical layer is formed on a surface on which the protective film and the release film are not provided of the polarizer.

Meanwhile, the optical layer may be directly attached or formed on the surface of the polyvinyl alcohol-based polarizer, or may also be attached on the protective film or other coating layers attached on one surface of the polyvinyl alcohol-based polarizer.

The method of forming the optical layer may be different depending on the type of the optical layer to form, and for example, methods of forming an optical layer well known in the art may be used, and the method is not particularly limited.

According to one embodiment of the present disclosure, a step of removing the release film may be further included after the forming of a bleached area. The removing of the release film may be conducted using a method of peeling the release film from the protective film. More specifically, the removing of the release film may be conducted using a method of peeling the release film from the protective film using a peeling roll or the like.

The release film performs a role of suppressing sagging occurrences (stretched in protective film direction) in the forming of a bleached area, and is preferably removed after the forming of a bleached area.

The bleached area of the present disclosure may mean a non-polarized portion. Accordingly, a polarizer having a non-polarized portion may be manufactured using the mask film.

Herein, the polarizer is not particularly limited, and polarizers well known in the art, for example, films formed with polyvinyl alcohol (PVA) including iodine or a dichroic dye are used.

The polarizer may have a thickness of 1 μm or greater, 3 μm or greater, 5 μm or greater, 7 μm or greater, 10 μm or greater, or 20 μm or greater. At the same time, the polarizer may have a thickness of 30 μm or less, and preferably 25 μm or less.

The bleached portion of the present specification may function as a non-polarized portion. In other words, a polarizer having a non-polarized portion may be manufactured using the mask film. The polarizer of the present disclosure as above may be used in manufacturing a polarizing plate.

Herein, the polarizer is not particularly limited, and polarizers well known in the art, for example, films formed with polyvinyl alcohol (PVA) including iodine or a dichroic dye are used.

The method for manufacturing a polarizing plate of the present disclosure may include laminating a polarizer protective film on the surface from which the mask film is removed.

As the protective film of the polarizer (polarizer protective film), those generally known in the art may be used, and for example, cellulose-based resins such as diacetyl cellulose or triacetyl cellulose, (meth)acryl-based resins, cycloolefin-based resins, olefin-based resins such as polypropylene, ester-based resins such as polyethylene terephthalate-based resins, polyamide-based resins, polycarbonate-based resins, or copolymer resins thereof may be used, however, the protective film is not limited thereto.

The polarizing plate manufactured using the manufacturing method of the present disclosure includes the polarizer having a non-polarized portion; and a protective film of the polarizing plate on at least one surface of the polarizer.

In one embodiment of the present disclosure, a polarizing plate in which the polarizer has at least one bleached area, the bleached area has single body transmittance of 80% or greater and a degree of polarization of 10% or less in a wavelength range of 400 nm to 800 nm, and the bleached area has a maximum sagging depth of 10 μm or less is provided.

According to one embodiment of the present disclosure, the area of the at least one bleached area may be greater than or equal to 0.5 mm$^2$ and less than or equal to 500 mm$^2$, and preferably greater than or equal to 0.5 mm$^2$ and less than or equal to 200 mm$^2$.

According to one embodiment of the present disclosure, a polarizing plate including a non-polarized portion having a size of greater than or equal to 0.5 mm$^2$ and less than or equal to 500 mm$^2$, and the non-polarized portion having edge roughness of 30 μm or less may be provided.

In the present disclosure, the sagging means sagging in a protective film direction occurring when the polyvinyl alcohol (PVA)-based polarizer is brought into contact with the bleaching solution.

Specifically, it means that a degree of sagging is smaller as the sagging depth is shallower, and, since appearance distortion is minimized in the polarizing plate, it has an advantage of uniformly coating an adhesive when laminating a protective film and the like on the other surface. As a result, defect occurrences may be reduced when manufacturing a polarizing plate having a structure including a protective film on both surfaces of the polarizer.

In addition, there is an advantage in that a polarizing plate having improved appearance may be provided as the sagging depth is shallower.

According to one embodiment of the present disclosure, the bleached area may have a maximum sagging depth of 8 μm or less, 7 μm or less, or 6 μm or less.

The sagging depth may be measured using a white light three-dimensional measuring device (optical profiler) or a confocal laser scanning microscope (CLSM).

The sagging depth may mean a value obtained by subtracting a minimum value from a maximum value of a distance between a surface facing the protective film of the polarizer and a surface opposite to the surface facing the protective film. In addition, the sagging depth may mean, when placing the polarizing plate on a flat surface, a difference in the height between the bleached area and the area that is not bleached on the protective film surface.

The polarizing plate according to one embodiment of the present disclosure has a bleached area in which single body transmittance is 80% or greater in a 400 nm to 800 nm wavelength range included in a visible region, arithmetic mean roughness (Ra) is 200 nm or less, and a degree of polarization is 10% or less.

As described above, the bleached area refers to an area formed by going through a process of selectively bringing a bleaching solution into contact with some areas of an iodine and/or dichroic dye-dyed polyvinyl alcohol-based polarizer.

The bleached area has single body transmittance of 80% or greater, preferably 90% or greater and more preferably 92% or greater in a wavelength range of 400 nm to 800 nm and more preferably 450 nm to 750 nm, which is a visible region. In addition, the bleached area has a degree of polarization of 10% or less and more preferably 5% or less. As the bleached area has higher single body transmittance and a lower degree of polarization, visibility is enhanced, and performances and image qualities of a camera lens to be located in the area may be further enhanced.

According to one embodiment of the present disclosure, single body transmittance of the area other than the bleached area of the polarizing plate is preferably from 40% to 47% and more preferably from 42% to 47%. Furthermore, the area other than the bleached area of the polarizing plate preferably has a degree of polarization of 99% or greater. This is due to the fact that the rest of the area other the bleached area needs to exhibit excellent optical properties shown in the range described above by performing a primary function as a polarizing plate.

According to one embodiment of the present disclosure, the bleached area may have arithmetic mean roughness (Ra) of 200 nm or less, and specifically, the arithmetic mean roughness (Ra) may be 100 nm or less or 80 nm or less, and more specifically 50 nm or less.

According to one embodiment of the present disclosure, the bleached area may have root mean square roughness (Rq) of 200 nm or less, and specifically, the root mean square roughness (Rq) may be 100 nm or less or 80 nm or less, and more specifically 50 nm or less.

The arithmetic mean roughness (Ra) is a value defined in JIS B0601-1994, and represents a value obtained by extracting from a roughness curve by a reference length in a direction of the average line, summing absolve values of the deviations from the average line of this extracted portion to the measurement curve, and averaging the result. The root mean square roughness (Rq) is defined in JIS B0601-2001. The arithmetic mean roughness (Ra) and the root mean square roughness (Rq) are measured using an optical profiler (Nanoview E1000, Nanosystem Co., Ltd.).

When polarizer surface roughness increases, haze generally increases by refraction and reflection of light. When the bleached area roughness satisfies the above-mentioned range, haze is sufficiently low, and clear visibility is obtained.

According to one embodiment of the present disclosure, the bleached area has haze of 3% or less, preferably 2% or less, and more preferably 1% or less.

According to one embodiment of the present disclosure, the bleached area has an iodine and/or dichroic dye content of 0.1% by weight to 0.5% by weight, and preferably 0.1% by weight to 0.35% by weight. This is due to the fact that, as discussed above, iodine present in a complex form on the polarizer by the reaction of the bleaching agent and the iodine is washed away resulting in a significant decrease in the iodine and/or dichroic dye content, and as a result, transmittance is greatly enhanced.

In contrast, according to one embodiment of the present disclosure, the area other than the bleached area has an iodine and/or dichroic dye content of 1% by weight to 4% by weight, and preferably 2% by weight to 4% by weight.

Herein, the iodine and/or dichroic dye content is measured using an optical x-ray analyzer (manufactured by Rigaku Corporation, trade name 「ZSX Primus II」). In the present disclosure, average % by weight per a volume of 19.2 mm$^3$ is measured using a polarizer sheet-type sample having a size of 40 mm×40 mm and a thickness of 12 μm.

According to another embodiment, the bleached area may be from 0.005% to 40% with respect to the total area of the polarizing plate.

An image display device may be manufactured using the polarizing plate according to the present disclosure as above.

More specifically, the present disclosure provides an image display device including a display panel; and the polarizing plate according to the embodiment described above attached to one surface or both surfaces of the display panel.

The display panel may include a liquid crystal panel, a plasma panel and an organic light emitting panel, and accordingly, the image display device may include a liquid crystal display device (LCD), a plasma display panel (PDP) and an organic light emitting diode (OLED).

More specifically, the image display device may be a liquid crystal display device including a liquid crystal panel and polarizing plates each provided on both surfaces of the liquid crystal panel, and herein, at least one of the polarizing plates may be the polarizing plate including the polarizer according to one embodiment of the present disclosure described above. In other words, the polarizing plate includes an iodine and/or dichroic dye-dyed polyvinyl alcohol-based polarizer, and a protective film provided on at least one surface of the polyvinyl alcohol-based polarizer, wherein a bleached area having single body transmittance of 80% or greater in a 400 nm to 800 nm wavelength range is locally included, the bleached area has arithmetic mean roughness (Ra) of 200 nm or less, a degree of polarization of 10% or less, and sagging of 10 μm or less.

Herein, types of the liquid crystal panel included in the liquid crystal display device are not particularly limited. For example, known panels including panels using a passive matrix method such as a twisted nematic (TN) type, a super twisted nematic (STN) type, a ferroelectric (F) type or a polymer dispersed (PD) type; panels using an active matrix method such as a two terminal type or a three terminal type; and an in plane switching (IPS) panel and a vertical alignment (VA) type panel may all be used without being limited by the types. In addition, types of other constitutions forming a liquid crystal display device such as upper and lower substrates (for example, color filter substrate or array substrate) are not particularly limited as well, and constitutions known in the art may be employed without limit.

According to one embodiment of the present disclosure, the image display device may be an image display device further including a camera module provided in a bleached area of the polarizing plate. By placing a camera module on the bleached area in which transmittance in a visible region is enhanced and a degree of polarization is removed, an effect of enhancing visibility of the camera lens unit may be obtained, and, by including the polarizing plate suppressing sagging of the bleached area, an effect of improving the appearance may also be obtained.

Hereinafter, the present disclosure will be described in detail with reference to examples. However, the examples according to the present disclosure may be modified to various other forms, and the scope of the present disclosure is not to be construed as being limited to the examples described below. Examples of the present disclosure are provided in order to more fully describe the present disclosure to those having average knowledge in the art.

<Preparation of Adhesive> a. Preparation of Copolymer Resin (A)

To a 1 L reactor having nitrogen gas refluxed and equipped with a cooling device to readily control a temperature, 94 parts by weight of butyl acrylate, 1 parts by weight of 2-hydroxyethyl (meth)acrylate and 5 parts by weight of acrylic acid with respect to 100 parts by weight of the whole reaction material were introduced. Then, the reactor was purged with nitrogen gas for 20 minutes to remove oxygen in the reactor, and the temperature of the reactor was maintained at 60° C. After that, 0.03 parts by weight of azobisisobutyronitrile, a reaction initiator, diluted in ethyl acetate in a concentration of 50% was injected thereto. The result was reacted for 8 hours to obtain a final acryl-based polymer (A).

b. Preparation of Copolymer Resin (B)

To a 1 L reactor having nitrogen gas refluxed and equipped with a cooling device to readily control a temperature, a monomer mixture formed with 91 parts by weight of butyl acrylate, 1 parts by weight of 2-hydroxyethyl (meth)acrylate, 4 parts by weight of acrylic acid and 4 parts by weight of methacryloyl polymethyl methacrylate with respect to 100 parts by weight of the whole reaction material was introduced, and 100 parts by weight of ethyl acetate was introduced thereto as a solvent. Then, the reactor was purged with nitrogen gas for 20 minutes to remove oxygen in the reactor, and the temperature of the reactor was maintained at 65° C. After that, 0.03 parts by weight of azobisisobuty- ronitrile, a reaction initiator, diluted in ethyl acetate in a concentration of 50% was injected thereto, and the result was reacted for 8 hours to obtain an acryl-based polymer material (B).

c. Mixing

With respect to 100 parts by weight of a copolymer obtained by mixing acryl-based copolymers A and B obtained from the above-described copolymerization process in a weight ratio of 9:1 (weight ratio of A:B), an tolylene diisocyanate adduct of trimethylolpropane, an isocyanate-based crosslinking agent, diluted to 50% in an ethyl acetate solution was introduced in a small quantity to prepare an adhesive. Modulus of the adhesive may be adjusted depending on the content of the crosslinking agent.

<Manufacture of Polarizer>

PREPARATION EXAMPLE

A polyvinyl alcohol-based film (Mitsubishi Chemical Corporation (former Nippon Synthetic Chemical Industry Co., Ltd.), M3000 grade, thickness 30 μm) went through a swelling process for 15 seconds in a 25° C. pure water solution, and then went through a dyeing process for 60 seconds in a 25° C. iodine solution having a concentration of 0.2 wt %. After that, the result went through a washing process for 30 seconds in a 45° C. solution having 1 wt % boric acid, and then a process of six times elongation was progressed in a 52° C. solution having 2.5 wt % boric acid. In addition, after the elongating process, the result went through a complementary color process in a 5 wt % KI solution, and then dried for 5 minutes in a 60° C. oven to prepare a polarizer having a thickness of 12 μm.

<Manufacture of Polarizing Plate Having Locally Bleached Area> a. Preparation Example 1

On the PET protective film having a thickness of 50 μm measured using the measurement method described in the specification, an acryl-based adhesive was coated to a thickness of 6 μm to form an adhesive layer, and a 15 μm PET release film was laminated on the adhesive layer to prepare a mask film. After that, a hole (perforated portion) having a diameter of 3 mm was perforated at an interval of 30 cm on the mask film with an output of 10 W and a pulse repetition rate of 20 kHz using a $CO_2$ laser. After that, the perforated mask film had the release film removed, and was laminated on both surfaces of the polarizer manufactured in the preparation example, and after bleaching a part coinciding with the mask film hole (perforated portion) by immersing into a 50° C. solution having 10 wt % KOH for 15 seconds, the result was neutralized by immersing for 10 seconds in a 50° C. aqueous solution having 5 wt % citric acid, and then dried for 5 minutes at 60° C. After that, the mask film was removed, and on both the removed surfaces, a TAC protective film was laminated using an adhesive to manufacture a polarizing plate having a locally bleached portion.

b. Preparation Examples 2 to 5

Polarizing plates having a locally bleached area were manufactured in the same manner as in Preparation Example 1 except that the adhesive layer was formed by coating the adhesive to a thickness of 10 μm, 15 μm, 30 μm and 80 μm, respectively.

c. Preparation Examples 6 to 10

Polarizing plates having a locally bleached area were manufactured in the same manner as in Preparation Example 1 except that the adhesive layer was formed by coating the adhesive to a thickness of 3 μm, 5 μm, 100 μm, 150 μm and 210 μm, respectively.

d. Preparation Examples 11 to 20

Polarizing plates having a locally bleached area were manufactured in the same manner as in Preparation Example 1 except that the perforated mask film had the release film removed, and was laminated on one surface of the polarizer manufactured in the preparation example, bleaching was conducted on a part of the polarizing plate coinciding with the mask film hole (perforated portion) by immersing into a 50° C. solution having 10 wt % KOH for 15 seconds, and the adhesive layer was formed by coating the adhesive to a thickness of 3 μm, 5 μm, 6 μm, 10 μm, 15 μm, 30 μm, 80 μm, 100 μm, 150 μm and 210 μm, respectively.

EXPERIMENTAL EXAMPLE

Time taken for bleaching when manufacturing the polarizing plate corresponding to each of Preparation Examples 1 to 20 was measured. As for the time taken for bleaching, the time for transmittance of the bleached portion reaching 80% or higher was measured as a time completing bleaching.

Edge roughness was measured by calculating a sum of an outside maximum difference and an inside maximum difference in a circle at a line drawn for every 2 degrees at any point of the bleached portion of each of the polarizing plates corresponding to Preparation Examples 1 to 20.

The measured values are described in the following Table 1. Preparation Examples 1 to 5 respectively correspond to Examples 1 to 5, and Preparation Examples 6 to 20 respectively correspond to Comparative Examples 1 to 15.

TABLE 1

|  | Number of Mask Film (Sheet) | Adhesive Thickness (pm) | Time Taken for Bleaching (s) | Edge Roughness (μm) |
| --- | --- | --- | --- | --- |
| Example 1 | 2 | 6 | 5 | 20 |
| Example 2 | 2 | 10 | 5 | 23 |
| Example 3 | 2 | 15 | 5 | 25 |
| Example 4 | 2 | 30 | 5 | 27 |
| Example 5 | 2 | 80 | 5 | 30 |
| Comparative Example 1 | 2 | 3 | 5 | >1000 |
| Comparative Example 2 | 2 | 5 | 5 | >1000 |
| Comparative Example 3 | 2 | 100 | 5 | 43 |
| Comparative Example 4 | 2 | 150 | 5 | 50 |
| Comparative Example 5 | 2 | 210 | 5 | 100 |
| Comparative Example 6 | 1 | 3 | 10 | >1000 |
| Comparative Example 7 | 1 | 5 | 10 | >1000 |
| Comparative Example 8 | 1 | 6 | 10 | 20 |
| Comparative Example 9 | 1 | 10 | 10 | 23 |
| Comparative Example 10 | 1 | 15 | 10 | 25 |
| Comparative Example 11 | 1 | 30 | 10 | 27 |
| Comparative Example 12 | 1 | 80 | 10 | 30 |
| Comparative Example 13 | 1 | 100 | 10 | 43 |
| Comparative Example 14 | 1 | 150 | 10 | 50 |
| Comparative Example 15 | 1 | 210 | 10 | 100 |

It was identified that, when laminating the mask film on both surfaces of the polarizer and conducting bleaching, the time taken for bleaching was shorter compared to when laminating the mask film on one surface of the polarizer. In addition, when the adhesive has a thickness of less than 6 μm, edge roughness was measured to be greater than 1000 μm due to the adhesive being transferred to the polarizer surface when removing the mask film after the bleaching reaction, and when the thickness was greater than 80 μm, edge roughness was greater than 30 μm due to adhesive slip and the like as in FIG. 5 during mask perforation. In other words, it was identified through Examples 1 to 5 that edge roughness had a value of 30 μm or less while reducing time taken for bleaching only when the adhesive had a thickness of 6 μm to 30 μm and the mask film was laminated on both surfaces of the polarizer. This means that a polarizing plate having a proper non-polarized portion with no decline in the device function may be manufactured when placing the bleached portion on a lens part of a device such as a camera module in a shorter period of time.

The invention claimed is:

1. A method for manufacturing a polarizing plate having a non-polarized portion, the method comprising:
    providing a pair of mask films, each mask film comprising a protective film, an adhesive layer disposed on one surface of the protective film, and a perforated portion integrally passing through the protective film and the adhesive layer, wherein the adhesive layer has a thickness of 6 μm to 80 μm;
    laminating the pair of mask films on both surfaces of a polarizer having a film form;
    bleaching a part of the polarizer corresponding to the perforated portion of each mask film to form a non-polarized portion in the polarizer; and
    removing the pair of mask films from the polarizer,
    wherein the non-polarized portion has an edge roughness of 30 μm or less.

2. The method for manufacturing a polarizing plate having a non-polarized portion of claim 1, further comprising:
    laminating a polarizer protective film on each of the surfaces from which the pair of mask films are removed.

3. A polarizing plate having a non-polarized portion manufactured using the manufacturing method of claim 1.

4. An image display device comprising the polarizing plate of claim 3.

5. A laminate comprising:
    a polarizer having a film form; and
    a pair of mask films disposed on both surfaces of the polarizer,
    wherein each mask film comprises a protective film, an adhesive layer disposed on one surface of the protective film, and a perforated portion integrally passing through the protective film and the adhesive layer.

* * * * *